(12) United States Patent
Trivedi et al.

(10) Patent No.: US 8,072,609 B1
(45) Date of Patent: Dec. 6, 2011

(54) ENHANCED SENSITIVITY VIBROMETER

(75) Inventors: Sudhir Trivedi, Baltimore, MD (US); Venkataraman Swaminathan, Bridgewater, NJ (US); Chen-Chia Wang, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 134 days.

(21) Appl. No.: 12/345,861

(22) Filed: Dec. 30, 2008

(51) Int. Cl.
*G01B 9/02* (2006.01)
(52) U.S. Cl. ........................................................ 356/486
(58) Field of Classification Search .................. 356/486, 356/498
See application file for complete search history.

(56) References Cited

U.S. PATENT DOCUMENTS

5,394,233 A * 2/1995 Wang ............................. 356/5.01
6,600,564 B1 * 7/2003 Wang et al. .................... 356/484
* cited by examiner Primary Examiner — Tarifur Chowdhury
Assistant Examiner — Jonathon Cook
(74) Attorney, Agent, or Firm — Henry S. Goldfine (57) ABSTRACT

An enhanced sensitivity laser vibrometer with increased output signal strength and more sensitive surface vibration detection, is provided by using a reflective mirror assembly to repeatedly bounce the sensing laser beam against the acoustic pressure-sensing diaphragm to magnify the acoustic incident pressure wave being detected. The enhancement in signal strength, in terms of power spectral density, is a function of the number of bounces squared and the detection of surface vibrations with a displacement of smaller than 4 picometers is demonstrated experimentally.

11 Claims, 5 Drawing Sheets

ENHANCED SENSITIVITY VIBROMETER

STATEMENT OF GOVERNMENT INTEREST

The invention described herein may be licensed, manufactured, and used by or for the Government of the United States of America, for government purposes, without the payment of royalties thereon or therefore to the inventor.

BACKGROUND OF THE INVENTION

1. Field of the Invention

The present invention relates in general to a laser vibrometer for the detection of acoustic signatures propagated through air and other media, and more particularly to such a system capable of enhanced resolution of such signatures.

2. Discussion of the Prior Art

Vibrometer technology involves the detection and analysis of pressure waves, such as acoustic waves or water waves, that might bear information regarding agitation sources of interest to the observer. Conventional microphones are capable of detecting such waves with varying degrees of accuracy and resolution satisfactory for general applications. All microphone-like devices and technologies possess a pressure-sensing interface, including but not limited to, a diaphragm that receives the incoming acoustic pressure waves and conform its physical motion to mimic that of the incident acoustic, i.e., pressure, waves. In conventional microphones, additional mechanical parts are in general connected to the diaphragm so as to convert the motion of the diaphragm into signals of electrical nature that allow further processing and applications. Such auxiliary mechanical parts might include an electrically conducting rod to induce alternating electrical currents that approximate the motion of the diaphragm, and hence the incoming pressure waves, or alternatively, to induce a capacitance which subsequently leads to a measurable electrical current. Unfortunately, such auxiliary mechanical parts add significant weight to the assembly, and alter/limit the resultant frequency response towards the lower end. Furthermore, such added weight also negatively impacts the sensitivity of the diaphragm assembly in detecting the incoming pressure waves, e.g., acoustic waves, due to the fact that such mechanical parts have innate inertia which can only be overcome by larger amplitude pressure waves, to move and generate detectable output signals.

A more modern alternative, as disclosed in U.S. Pat. Nos. 4,554,836 and 5,883,715, involves use of laser vibrometers, i.e. optical microphone technology that does not require auxiliary mechanical components. Instead, a beam of light, such as a laser, is split into two parts, one which forms a reference beam and the second which forms a sensing beam which impacts the target surface, e.g., the pressure-sensing diaphragm, and is reflected therefrom, the sensing beam. The sensing beam is heterodyned with the reference beam to produce a phase modulated signal, an interference pattern. This interference pattern models the surface displacement of the target surface, is converted via, an optical interferometer, i.e., a Michelson interferometer, and photodetectors, i.e., photodiodes, to generate a usable, alternating electric current, which mimics the motion/vibration of the target surface, i.e., the pressure-sensing diaphragm.

A known refinement on the laser vibrometer involves using optical grating-like devices consisting of a structure of interdigitated fingers constructed with semiconductors using processes similar to MicroElectroMechanical Systems (MEMS) technology. Instead of using optical interferometers and photodiodes to determine the diaphragm movement, an optical beam is shone onto the semiconductor MEMS like structure while the back-diffracted light beam intensity is monitored. Movements of the interdigitated fingers cause the back-diffracted light beam intensity to exhibit similar temporal changes and thus by monitoring the diffracted light beam intensity, interpretation of the diaphragm movement can be obtained.

In some state-of-the-art optical microphones, an optical fiber probe is deployed with a pressure-sensing diaphragm attached to the tip thereof. The probe light is projected onto the sensing interface and the back-reflected light is collected by the optical fiber tip and sent to the optical interferometer for signal retrieval. In such approaches, the detection sensitivity is very limited due in part to the fact that the aperture of optical fiber is generally very limited, especially for the single-mode fiber that is needed for the said fiber-optic microphones to avoid the generation of higher order modes that would diminish the detected signal output. As a result, the probe light beam must be projected onto the pressure-sensing interface within a very tight angle from normal incidence. This means that the probe light beam can only interrogate the pressure-sensing interface once and hence no possibility of further boosting up the detected signal strength.

Frequently, the detection, resolution and analysis of pressure waves from very weak acoustic signals is required, such as detection of molecules emitted from certain explosives and detection of submerged submarines. In general, optical microphones suffer from limited sensitivity and scalability of output which limits their applicability to analysis of such weak signals. This limited sensitivity results from use of optical interferometers for the detection mechanism, wherein the wavelength of the light beam involved is used as a gauge to monitor the scale of movement of the pressure-sensing diaphragm. Because the optical light sources have a wavelength of approximately 1 micrometer, it becomes increasingly difficult to detect diaphragm movements in scales smaller than 1 nanometer ($10^{-9}$ meter). Further, with weak signals and longer standoff distances, i.e., the distance between the source and sensing interface or diaphragm, it may become necessary to detect diaphragm movements in the order of 1 picometer ($10^{-12}$ meter). In fact, for the above examples, involving very weak pressure waves, at distances in the tens of meters away from the diaphragm, it is necessary to detect vibrations of the diaphragm even less than 1 picometer ($10^{-12}$ meter).

SUMMARY OF THE INVENTION

The foregoing problems are overcome, and other advantages are provided in accordance with the subject invention, using either a continuous-wave or pulsed laser source vibrometers to generate a reference and a sensing beam, wherein the sensing beam is bounced at least once, preferably twice, or most preferably multiple times, against the pressure-wave sensing diaphragm, using a reflective mirror assembly that is appropriately sized and curved, to enhance the signal strength being captured by the sensing beam, in terms of power spectral density, and to enhance the resolution of the vibration being captured by the sending beam. The signal strength is enhanced as a function of the number of bounces squared and the resolution is enhanced down to an experimentally demonstrated displacement of the pressure-wave sensing diaphragm of approximate 4 picometers with further improvements in detection sensitivity expected. This process involves splitting the laser emission into two parts or branches, the first part being the reference beam which is projected onto a photosensor directly. The second part or branch is the sensing beam, which is repeatedly bounced off a mirror onto the pressure-wave sensing diaphragm, or interface, before being sent to the photosensor for comparison with the reference beam. The comparison uses standard laser vibrometers interference technology, disclosed in U.S. Pat. Nos. 4,554,836 and 5,883,715, which are incorporated herein by reference. Another approach for said comparison is the adoption of photo-EMF sensors, disclosed in U.S. Pat. No. 6,600,564 which are also incorporated herein by reference. Which photosensor is capable of detecting the temporal phase variations between the reference and sensing light beams by generating photocurrents which mimic those of the phase variations between the light beams and therefore the vibrations of the diaphragm's surface.

It is an object of the subject invention to provide a method for measuring and characterizing pressure waves that is more sensitive and accurate than prior methods. This sensitivity provides the advantage of allowing the detection of markedly weaker acoustic signatures, at much greater standoff distances.

Also, among the advantages of the subject invention is the ability to scale the detection sensitivity to adjust the measurement range to the magnitude of the pressure wave, by adjusting the total number of bounces the sensing beam makes with the pressure-sensing interface.

Also among the advantages of the invention is the capability of multi-channel operation and improved operation efficiency.

These and other objects, features and advantages will be apparent from the discussion which follows. The various features of novelty which characterize the invention are pointed out with particularity in the claims annexed to and forming a part of this disclosure. For a better understanding of the invention, its advantages and objects, reference is made to the accompanying drawings and descriptive matter.

DETAILED DESCRIPTION OF THE INVENTION

Figure 1:
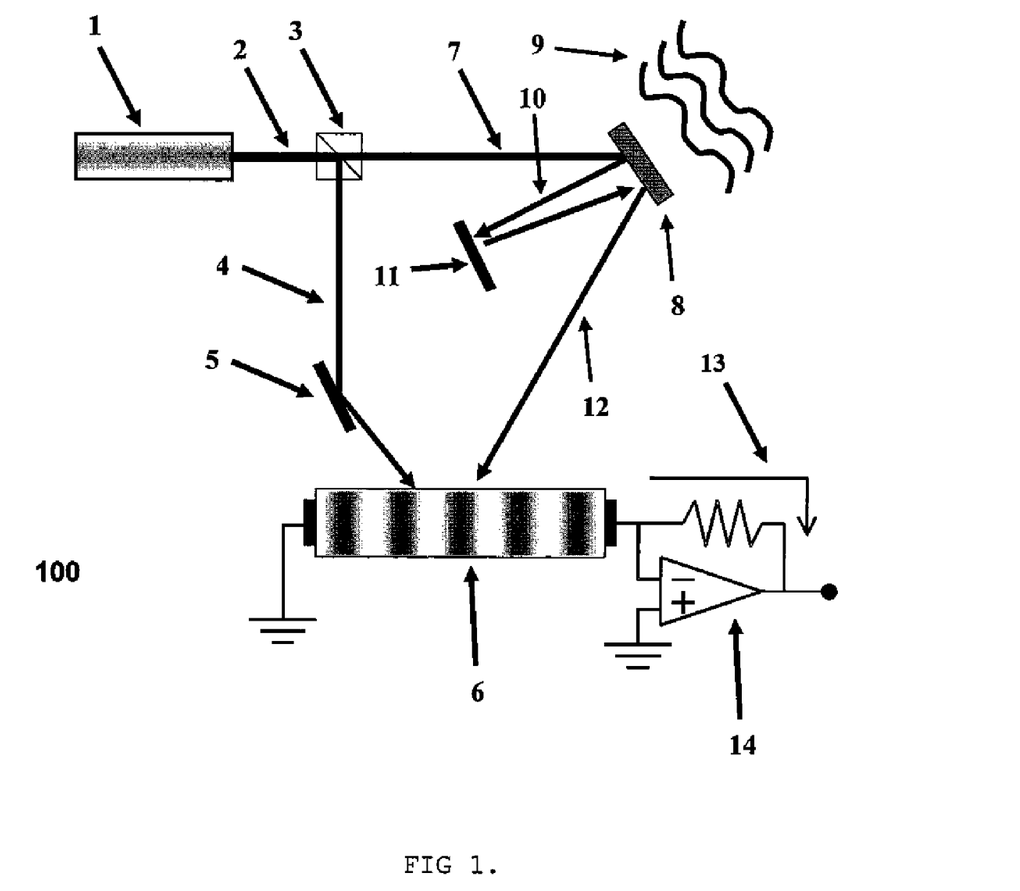
FIG. 1 depicts an embodiment of the laser vibrometer of the present invention.

Referring now to the drawings, wherein like reference numerals designate identical or corresponding parts among the various drawings, and more particularly to FIG. 1, depicts a preferred embodiment of the present enhanced sensitivity laser vibrometers 100. The laser light source 1, can be either a continuous or a pulsed laser, preferably a pulsed laser, which may be either a conventional, modestly average-powered, Q-switched and mode-locked laser, such as, a neodymium-doped yttrium aluminum garnet laser (Nd:YAG), which emits a light beam 2. The emitted light beam 2 is then split into two branches by a standard beam splitting element 3. The reference light beam 4, newly split from beam 2, is directed via a mirror 5 to a standard photo-EMF sensor 6, such as, a cadmium telluride doped with vanadium (CdTe:V) based photo-EMF sensor. The sensing light beam 7, is directed onto a pressure-sensing interface, a diaphragm 8, whose motion is being affected and controlled by the incident pressure wave 9, the acoustic signature of interest. The pressure-sensing diaphragm 8, has a mirror-like surface finish on at least the face where the sensing beam 7 impinges thereon, to minimize any reflection and scattering optical losses that might be suffered by the reflected light beam 10. The initial reflected sensing light beam 10 is re-directed by the reflective mirror assembly 11 back onto the pressure-sensing diaphragm 8, a set number of times by appropriately sizing and curving the reflective mirror assembly, to enhance the measurement of the acoustic signature 9. While only two bounces are made by the probe light beam onto the pressure-sensing diaphragm in the embodiment shown in FIG. 1, it is to be understood that the total number of bounces can be more or less than 2, with the upper bound number being determined by the loss characteristics of the system/components involved, the distance between the diaphragm element 8 and the reflective mirror assembly 11, the laser 1 power level, and in the case of the shown pulsed light source, the laser pulse width. The final sensing beam 12, upon completion of the desired number of bounces, exits the diaphragm mirror assembly. The final sensing beam 12 is directed onto the photo-EMF sensor 6, which heterodynes this final sensing beam 12 with the reference beam 4 to output an analog signal whose phase modulation is proportional to the displacement of the diaphragm 8 caused by the incident pressure wave 9. This analog signal is the photocurrent signal 13 that can be converted into voltage signal using a transimpedance amplifier 14, which voltage signal is displayed or sent to a digital computer for analysis and reporting.

The photocurrent signal 9 generated by the photo-EMF sensor 6 can be approximately as:

$$j^{\Omega}(t) = \kappa \phi(t) \times P_{probe}(t) \quad (1)$$

where $P_{probe}(t)$ is the back-scattered sensing light beam power density impinging onto the photo-EMF sensor 6 and $\kappa$ is a constant determined by the geometric arrangement of the light beams, sensor material characteristics, photon energy, as well as the reference light beam intensity. Herein $\phi(t)$ represents the total amount of phase modulation imposed onto the sensing light beam 7 by the pressure-sensing diaphragm 8. Equation (1) shows that stronger signal photocurrents are generated when the amount of phase modulation is increased or a higher optical power density of the sensor light beam is available. In the subject invention, the output signal strength and its detection sensitivity are maximized by using both the multi-bounce embodiment to be described below for the sensing light beam 7 as well as the deployment of a pulsed light source, including but not limited to, Q-switched and mode-locked lasers where the laser energy is concentrated within short time periods to produce transiently very high peak optical power density levels while maintaining modest optical power density level averaged over time.

Considering the presence of a temporal pressure wave of sinusoidal nature and that, upon its interaction with the pressure-sensing diaphragm 8, causes the pressure-sensing diaphragm 8 to conform and exhibit surface vibrations that can be described mathematically as:

$$d \sin(\omega t) \quad (2)$$

where $\omega$ is the angular frequency of the vibration as well as that of the impinging pressure wave 9 and d is the maximal displacement of the pressure-sensing diaphragm 8 under the effects of the impinging pressure wave 9. Note that there exists a conversion relationship between the strength of the impinging pressure wave 9 and the resultant surface displacement by the sensing diaphragm 8. The said relationship is to be determined by the design, dimensions, and the characteristics of the materials forming the pressure-sensing diaphragm 8. The amount of phase modulation imposed onto the sensing light beam 7 upon its one bounce from the pressure-sensing diaphragm 8 is given by:

$$4\pi d \sin(\omega t)/\lambda \quad (3)$$

where $\lambda$ is the wavelength of the light beam. By repeatedly bouncing the sensing light beam 7 onto the diaphragm 8, as shown schematically in FIG. 1, it can be shown that the total amount of phase modulation suffered by the sensing light beam 7 upon its final exit from the pressure-sensing diaphragm 8, as the final sensing beam 12, and reflective mirror assembly 11 is given by:

$$\phi(t) = \Sigma_n d \sin[\omega t + (n-1)\phi_0] \times 4\pi/\lambda \quad (4)$$

where n=1, 2 . . . N, with N representing the total number of bounces the sensing beam strikes the pressure-sensing diaphragm. The static phase $\phi_0 = \omega \times 2$ L/c, where L is the separation between the pressure-sensing diaphragm 8 and the reflective mirror assembly 11 and c is the speed of light, is the additional phase delay experienced by the sensing light beam 7 upon its round-trip passage between the pressure-sensing diaphragm 8 and the reflective mirror assembly 11. It can be seen readily from Equation (4) that if the additional phase shift N×$\phi_0$ is negligible due to, for example, the limited number of bounces or minimal separation between the pressure-sensing diaphragm 8 and the reflective mirror assembly 11 (i.e., N×2 L<<the spatial extent of the laser pulses), the total phase modulation suffered by the probe light beam can then be approximated by:

$$\phi(t) \approx N \times d \sin(\omega t) \times 4\pi/\lambda \quad (5)$$

which is greater than the phase modulation imposed by the single-bounce embodiment, Equation (3), by a factor of N. Thus, under these conditions, the vibration amplitude of sensing diaphragm caused by the incident pressure waves can be effectively amplified by the multi-bounce embodiments of the invention which proportionally enhances the resultant output signal strength, as clearly indicated by Equation (1). Indeed, the enhancement in the detected output signal strength expressed in power spectral density is given by $N^2$. Thus by increasing the number of total bounces, N, the invention can greatly improve the detected output signal strength caused by the impinging pressure waves.

To achieve a large bounce number, N, it might be necessary to modify the embodiment of the invention by minimizing the distance, L, between the pressure-sensing diaphragm and the reflective mirror or other optical designs, and inserting an optical gain/amplifier element in order to compensate for the scattering and absorption losses that might be experienced by the probe light beam bouncing between the pressure-sensing diaphragm and the supportive reflective mirror. It is also to be understood that other designs and layouts for the sensing diaphragm and the reflective mirror can be adopted to support the multi-bouncing approach of the invention, including, for example, an imperfect optical resonant cavity consisting of a planar pressure-sensing diaphragm and a concave or convex reflective mirror with readout holes allowing the probe beam to achieve final exit from the assembly.

Any multi-bounce embodiment of the subject invention adds up, linearly, the coherent pressure wave signals present at the pressure-sensing diaphragm, resulting in the amplification and enhancement in the detected signal strength. Incoherent signal sources, for example, spurious noise sources, do not add up coherently but instead tend to destructively interfere and hence no or less amount of amplification and enhancement in the output noise strength is to be observed. The invention thus achieves its enhanced detection sensitivity by effectively amplifying the useful, desirable signal strength without amplifying at the same time spurious noises, leading to better and improved signal-to-noise ratios when used to detect and monitor pressure waves of interest. Associated with such improved detection sensitivity is the elongation of the standoff detection distance, should the invention be embodied to perform such measurements and applications.

Example 1

Figure 2:
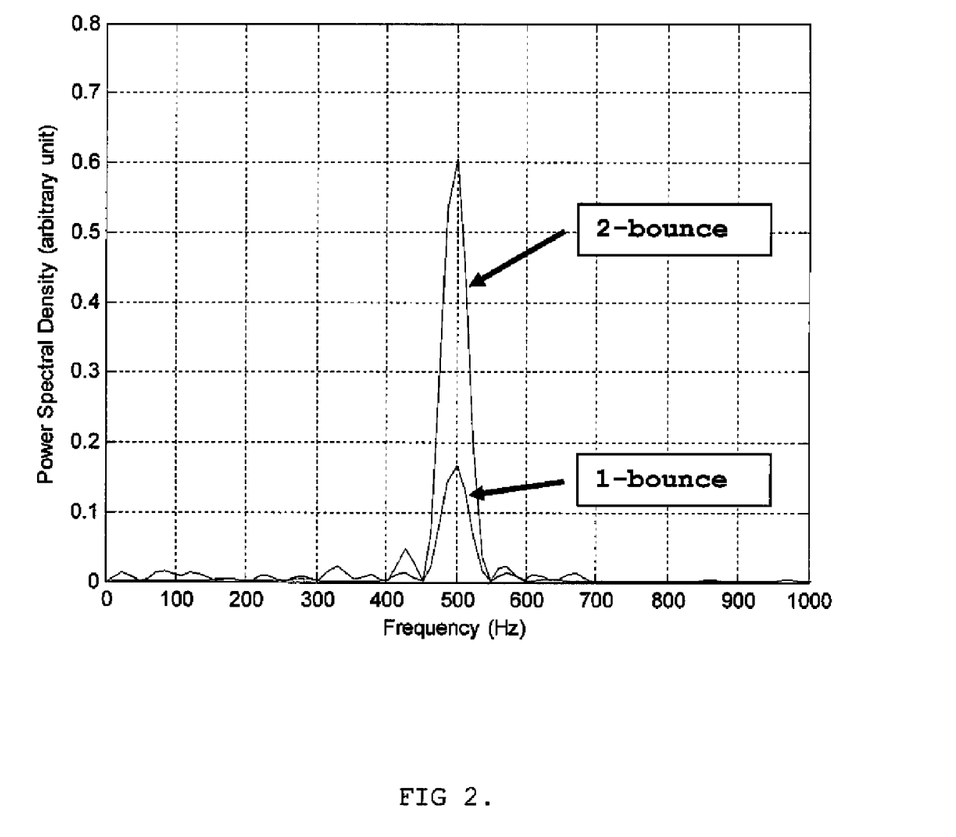
FIG. 2 shows the relative power spectral density output of a one-bounce, lower trace, and a two-bounce, upper trace, embodiment of the present invention.

Using the preferred embodiment shown in FIG. 1, with a pulsed laser, a 1-bounce configuration was compared to a 2-bounce configuration, to monitor the surface vibrations of a mirror being agitated sinusoidally at the frequency of 500 Hz, with a surface displacement of 3.2 nanometers (nm). The output signal strength detected by the invention configured in the 1- and 2-bounce configurations and expressed in terms of power spectral density, was plotted; which plots are depicted in FIG. 2. FIG. 2 shows clearly that the invention configured in the 2-bounce embodiment generated an output signal strength that is a factor of $2^2=4$ times greater than that when the invention was configured in the 1-bounce embodiment, a result predicted in Equations (1, 5).

Example 2

Figure 3:
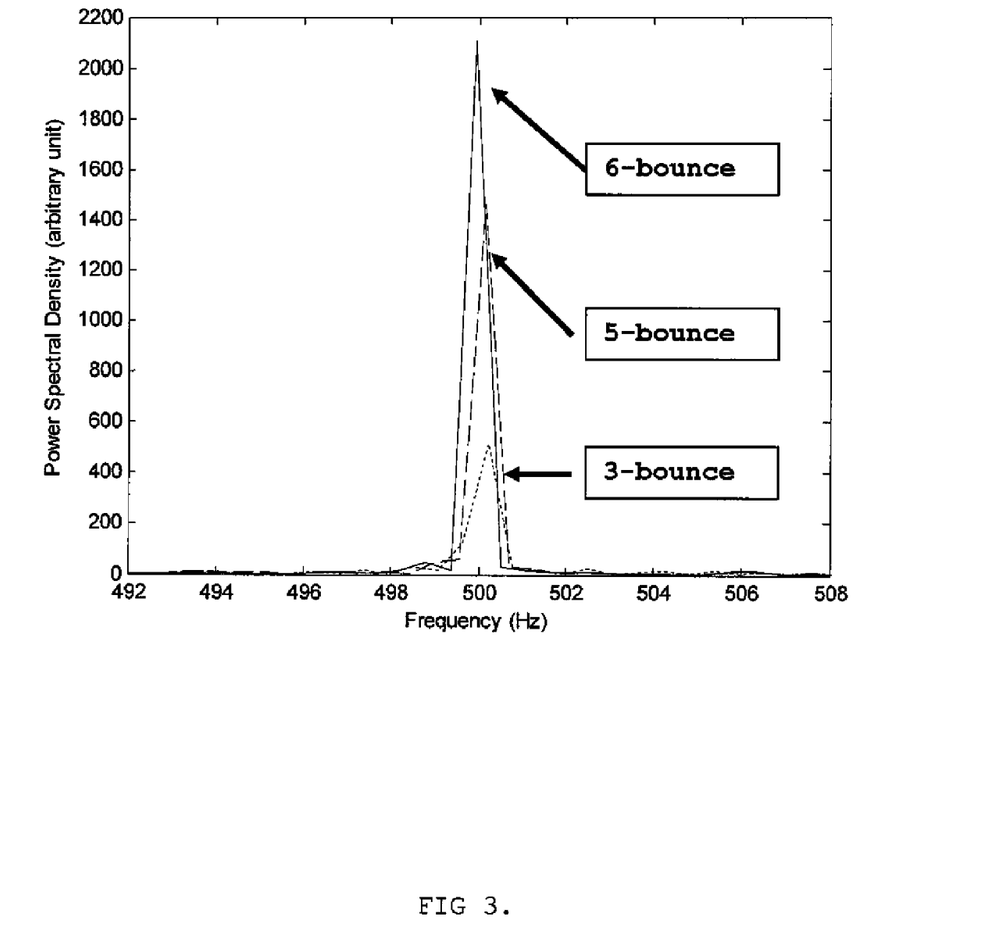
FIG. 3 shows the power spectral density output from 3- (lower trace), 5- (middle trace), and 6-bounce (upper trace) embodiments of the present invention.

The advantages of enhanced output signal strength and improved detection signal-to-noise ratios for the subject invention when used to monitor the vibrations of pressure-sensing diaphragm are further demonstrated in FIG. 3, which depicts the output signal strength from the preferred embodiment of the subject invention as shown in FIG. 1, using a pulsed laser, and alternative 3-, 5-, and 6-bounce configurations. As predicted by Equations 1 and 5, the increase in output signal strength in proportion to the square of the total number of bounces made by the sensing light beam onto the pressure sensing diaphragm is obviously shown. Thus, simply by increasing the number of bounces, the invention is able to boost its detected output signal strength without resorting to time-consuming averaging or amplifying the noise floor, resulting in better detection sensitivity in sensing the pressure waves as well as improved signal-to-noise ratios in those measurements.

Example 3

Figure 4:
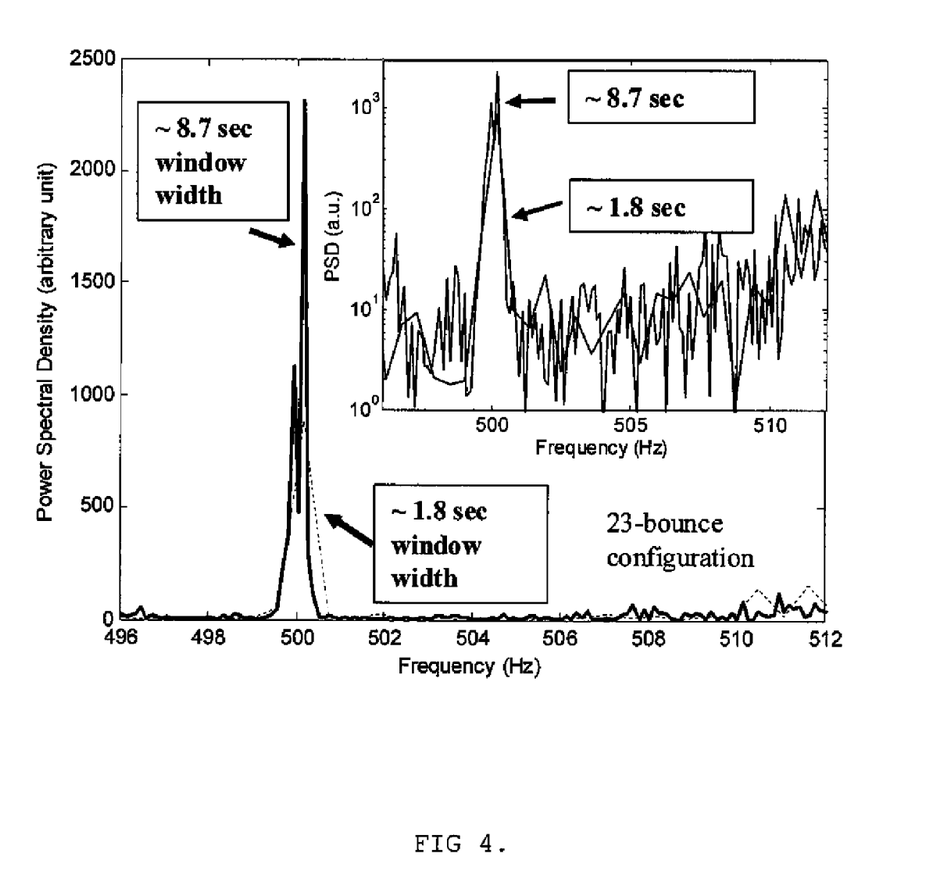
FIG. 4 shows the power spectral density output of a 23-bounce embodiment of the present invention.

An unexpectedly large improvement in detection sensitivity is shown in FIG. 4, using the preferred embodiment of FIG. 1, with a pulsed laser, and a 23-bounce configuration. In this example, the pressure-sensing diaphragm was vibrating at the frequency of 500 Hz and the very minute surface displacement of merely 40 pm ($4 \times 10^{-11}$ meter). The dotted trace was taken with a 4096-point data window (~1.8 sec time window width) while the solid curve was obtained over a 20,000-point data window (~8.7 sec data window width, assuming a steady laser pulse repetition rate of roughly 2.3 kHz), leading to finer frequency resolution. The minor peak in the solid trace was caused by the sudden shift in laser repetition rate during the longer data acquisition time period. The inset shows the same spectra in logarithm scales to facilitate the comparison between the detected signal peak strength and the adjacent noise floor which further illustrates the detection sensitivity of this invention when configured in the 23-bounce embodiment. Analysis of this figure, shows the invention, when configured in the 23-bounce embodiment, was able to detect, clearly and with excellent signal-to-noise ratios, the underlying small-amplitude surface vibrations, which shows that the detected signal power spectral density emanating above their adjacent noise floor by a factor in excess of 100. Such a high sensitivity, implies that displacements smaller than 4 picometers should be resolvable over the noise floor (when it becomes possible to measure such a small displacement) based on the existing experimental setup and conditions described in FIG. 4. Note that both of the signal peaks shown in FIG. 4 were detected when the invention was configured in the subject 23-bounce embodiment. The increased signal strength corresponding to ~8.7 sec data acquisition window width is caused by the enhanced frequency resolution in the spectra.

Example 4

The procedure of Example 1 was repeated, with the only change being use of a continuous-wave laser light source in place of a pulsed laser light source. The continuous-wave laser light source used was a conventional, low power gas laser. Any such conventional low power gas lasers can be used, such as a helium-neon laser, having a band width in the range of from 1 to 10 MHz. This alternate embodiment resulted in a weaker, less enhanced, photocurrent signal strength compared to that generated using a pulsed laser light source, shown in FIG. 1. Such a lower enhancement using a continuous-wave laser light source may be related to the fact that a continuous-wave laser light source, in general, has much lower peak optical power densities than those that can be achieved by pulsed light sources.

Based upon the above examples, a second significant finding is that the subject invention achieves improvements in detection sensitivity without any increase in the amount of optical power densities used in the embodiment. The said improvements are achieved simply by adopting the multi-bounce approach described in this invention.

Figure 5:
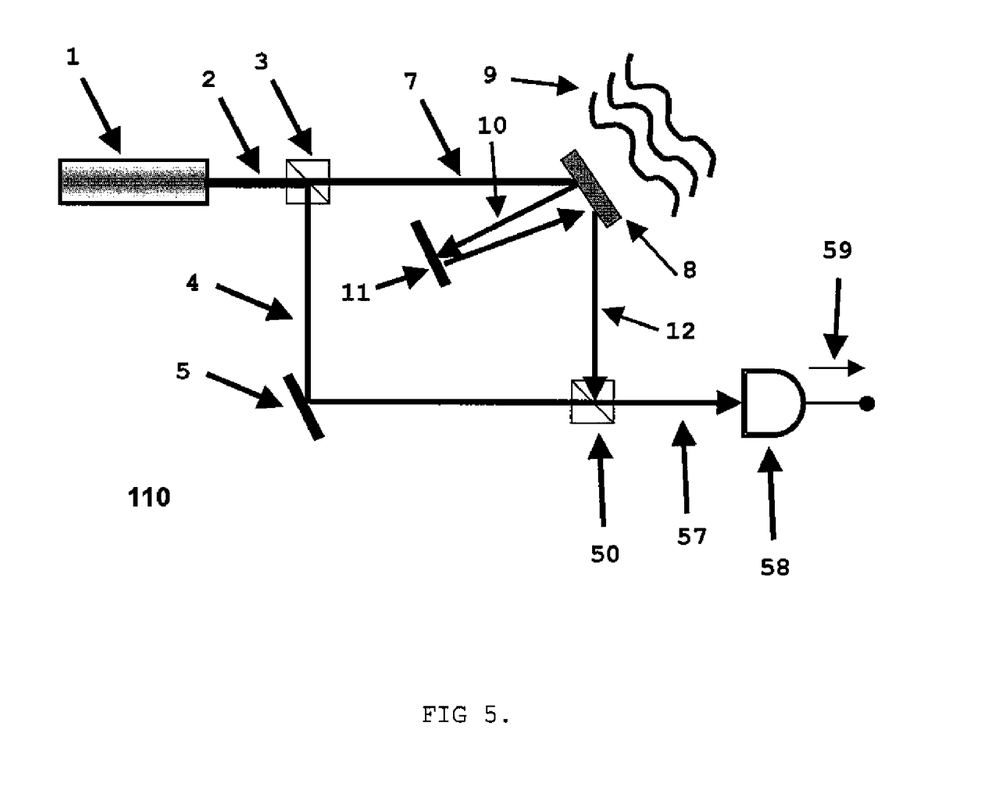
FIG. 5 depicts an alternative embodiment of the invention.

An alternative embodiment 110 of the present invention, FIG. 5, using either a continuous or pulsed wave laser light source, replaces the photo-EMF sensor 20 of the above preferred embodiment with a conventional photodetector, a photodiode 58. It is understood that as in the above preferred embodiment, the photodiode 58 generates photocurrent signals 59 that can be converted into voltage signals for further signal processing and information retrieval. However, this alternative embodiment will tend to have a lower detection dynamic range and higher distortion in the output signals due to the fact that photodiodes generally require that both the reference and probe light beams to be aligned in a nearly parallel manner. Any deviation from mutual parallelism would reduce the conventional photodetector's output signal strength. The multi-bounce approach adopted by the invention would in general imply that the probe light beam, after exiting from the pressure-sensing diaphragm and reflective mirror assembly, is spatially shifted relative to the reference light beam with the amount of spatial shift determined by the amplitude or displacement of the pressure-sensing diaphragm. Thus it would be difficult, if not impossible, for the embodiment to maintain sufficient parallelism and spatial overlap between the probe and reference light beams, other than in the limited cases of very small surface vibration displacements. Furthermore, the beam combining element 50 used to align and mix the reference and sensing light beams before detection by the conventional photodetector would also in general impose optical losses onto both light beams. For example, a 50/50 optical beam splitter would reduce the light beam intensity reaching the photodetector by a factor of 2, further reducing the detected signal strength that can be generated by the embodiment of the invention shown in FIG. 5 compared to that by the preferred embodiment shown in FIG. 1, under similar circumstances and conditions.

What is claimed is:

1. A laser vibrometer capable of detecting and displaying pressure waves from acoustic signals comprising:
   means for propagating a beam of monochromatic light;
   means for splitting said beam of monochromatic light into a reference beam and a sensing beam, said reference beam being directed to a photosensor;
   a pressure-sensing diaphragm having a first side which when impacted by the pressure waves responsively vibrates;
   said pressure-sensing diaphragm having a second side, which has a mirror-like surface finish;
   said sensing beam being directed against said second side of said pressure sensing diaphragm, said sensing beam being reflected therefrom to a reflective mirror assembly, which mirror assembly is sized and curved to re-reflect said sensing beam back against said pressure sensing diaphragm three or more times;
   said sensing beam is then directed to said photosensor, wherein said photosensor is a photo-EMF sensor, which heterodynes this the sensing beam with the reference beam to output an analog signal whose phase modulation is proportional to the displacement of the diaphragm caused by the incident pressure wave, wherein a displacement of the diaphragm as small as approximately 4 picometers or less can be detected;
   means whereby said analog signal is displayed.

2. The laser vibrometer of claim 1, wherein said means of propagating said beam of monochromatic light is a pulsed laser.

3. The laser vibrometer of claim 2, wherein said pulsed laser is selected from the group consisting of Q-switched and mode-locked lasers.

4. The laser vibrometer of claim 1, wherein said means for splitting said beam is a 50:50 beam splitting cube, wherein all input and output faces are AR-coated and non-polarizing.

5. The laser vibrometer of claim 1, wherein said means of propagating said beam of monochromatic light is a continuous laser.

6. The laser vibrometer of claim 1, wherein said analog signal is converted to a voltage level signal using a transimpedance amplifier, which amplified signal is displayed.

7. The laser vibrometer of claim 1, wherein said analog signal is converted to a voltage level signal using a transimpedance amplifier, which amplified signal is sent to a digital computer for analysis and reporting.

8. The laser vibrometer of claim 1, wherein said sensing beam is re-reflected back against said pressure sensing diaphragm at least 3 times, wherein the signal strength is enhanced as a function of the number of bounces squared.

9. A method of measuring the vibration of an acoustic wave sensing diaphragm comprising the steps of:
   providing a monochromatic beam of light;
   splitting said beam of monochromatic light into a reference beam and a sensing beam, said reference beam being directed to a photosensor;
   providing said pressure-sensing diaphragm having a first side which is impacted by the acoustic wave and a second side, which has a mirror-like surface finish;
   directing said sensing beam against said second side of said pressure sensing diaphragm, said sensing beam being reflected therefrom to a reflective mirror assembly, which mirror assembly is sized and curved to re-reflect said sensing beam back against said pressure sensing diaphragm 3 or more times;

directing said sensing beam to said photosensor;

wherein, said photosensor is a photo-EMF sensor, which heterodynes and compares said reference and said sensing beams, thereby generating photocurrents equivalent to any temporal phase shift between the beams, which photocurrents mimic the vibration of the acoustic wave;

providing an output device to observe said photocurrents, which photocurrents can show displacements of said pressure-sensing diaphragm of as small as approximately 4 picometers or less.

10. The method of measuring the vibration of the acoustic wave sensing diaphragm of claim 9, wherein said monochromatic beam of light is generated by a pulsed laser.

11. The laser vibrometer of claim 1, wherein said sensing beam is re-reflect back against said pressure sensing diaphragm a number of times selected from the group consisting of 3, 5, 6, and 23 times.

* * * * *